United States Patent [19]
Weiss

[11] Patent Number: 5,476,356
[45] Date of Patent: Dec. 19, 1995

[54] BALE HANDLING APPARATUS

[76] Inventor: Leonard D. Weiss, 13799 Highway 71, Brush, Colo. 80723

[21] Appl. No.: 375,806

[22] Filed: Jan. 19, 1995

[51] Int. Cl.$^6$ ................................................. B66F 7/22
[52] U.S. Cl. ........................................ 414/704; 414/24.5
[58] Field of Search ............................. 414/24.5, 704, 414/721

[56]  References Cited

U.S. PATENT DOCUMENTS

| | | | |
|---|---|---|---|
| 2,671,570 | 3/1954 | Richey | 414/704 X |
| 2,999,608 | 9/1961 | Ganahl | 414/721 X |
| 3,455,477 | 7/1969 | Blair | 414/704 |
| 4,674,933 | 6/1987 | Brown | 414/24.5 X |

FOREIGN PATENT DOCUMENTS

| | | | |
|---|---|---|---|
| 738825 | 7/1966 | Canada | 414/704 |
| 2142901 | 1/1985 | United Kingdom | 414/721 |

*Primary Examiner*—Michael S. Huppert
*Assistant Examiner*—Janice L. Krizek
*Attorney, Agent, or Firm*—Dean P. Edmundson

[57]  ABSTRACT

Apparatus for use with a tractor loader, and including a support, elongated teeth attached to a frame, a retainer above the teeth which is pivotable between upper and lower positions, and a push arm between the teeth and the retainer which is movable between retracted and extended positions. The apparatus can handle various types of bales of hay, straw, etc. It can also be used to lift and transport loose fibrous material. The retainer is pivoted downwardly to grip and hold the material on the teeth. When the retainer is pivoted upwardly, the push arm can be moved to its extended position to urge the material off the forward ends of the teeth.

18 Claims, 3 Drawing Sheets

BALE HANDLING APPARATUS

FIELD OF THE INVENTION

This invention relates to apparatus used to move hay, straw, etc. from one location to another. More particularly, this invention relates to apparatus for use in combination with a conventional farm tractor loader for handling hay, straw, etc.

BACKGROUND OF THE INVENTION

Hay, straw, and other fibrous material is typically baled so that it can be handled, transported and stored. Such material may be formed into small or large bales which may be square or round. Normally, bales of material are stacked upon one another in a stack for storage. They may also be stacked upon each other on trailers or trucks for transport.

A variety of equipment has been previously used to lift and carry bales. For example, small bales can be picked up off the ground and stacked automatically on powered bale wagons, after which the bales are unloaded into stacks. Large bales can be picked up from the ground by means of a tractor loader with a grapple fork or by means of a forklift or other suitable equipment. The prior types of equipment are typically specifically designed for handling specific types of bales and are not suitable for handling all types of bales.

Tractor loaders having a bucket and a grapple fork or clamp arm are described in U.S. Pat. Nos. 3,348,715, 4,403,906, and 5,094,581. Various types of stackers for handling loose hay or stray have been previously used (e.g., U.S. Pat. Nos. 2,619,242 and 2,676,719). Tractor loaders with buckets and push-off plates have also been previously known (e.g., U.S. Pat. Nos. 2,798,627 and 3,079,021).

Various types of large bale transporting devices have also been described. See, for example, U.S. Pat. Nos. 3,985,246; 3,974,926; 3,934,726; 4,073,532; 4,264,252; and 4,367,062. None of such devices, however, are capable of handling all types of baled materials.

There has not heretofore been described apparatus or equipment which is capable of readily and effectively lifting and handling all types of baled materials.

SUMMARY OF THE PRESENT INVENTION

In accordance with the present invention there is provided bale handling apparatus for use in combination with a tractor loader having lift arms which can be raised and lowered. In a preferred embodiment the apparatus comprises:

(a) a support frame member having upper and lower portions;
 (b) a plurality of elongated tines or teeth members attached to said lower portion of the frame member and projecting forwardly from the frame member;
 (c) a retainer member pivotally attached to the upper portion of the frame above the teeth members; wherein the retainer member is pivotable between upper and lower positions; and
 (d) a push arm between the teeth members and the retainer member; wherein the push arm is movable between retracted and extended positions to move objects (e.g., bales) on the teeth members away from the support frame member and off of the outer end of the teeth members.

The apparatus is especially useful and effective for lifting and handling all types and sizes of bales (square or round, large or small). The apparatus is able to grasp, lift and transport bales regardless of the type of material in the bales. The apparatus can lift bales from the ground, or from a stack, or from a truck or trailer, etc. Consequently, the apparatus is very useful in lifting and transporting bales from any location.

If desired, grapple forks may be attached to the retainer member (preferably to the forward edge of the retainer member) for enhanced gripping action on large bales or loose fibrous material.

In a preferred embodiment, the teeth or tines are detachable from the support frame. This enables a damaged tine to be removed and replaced when necessary. This also enables all the tines to be replaced with longer or shorter tines, as may be desired for handling a particular type of bale, fibrous material, or some other object.

Other advantages of the bale handling apparatus of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
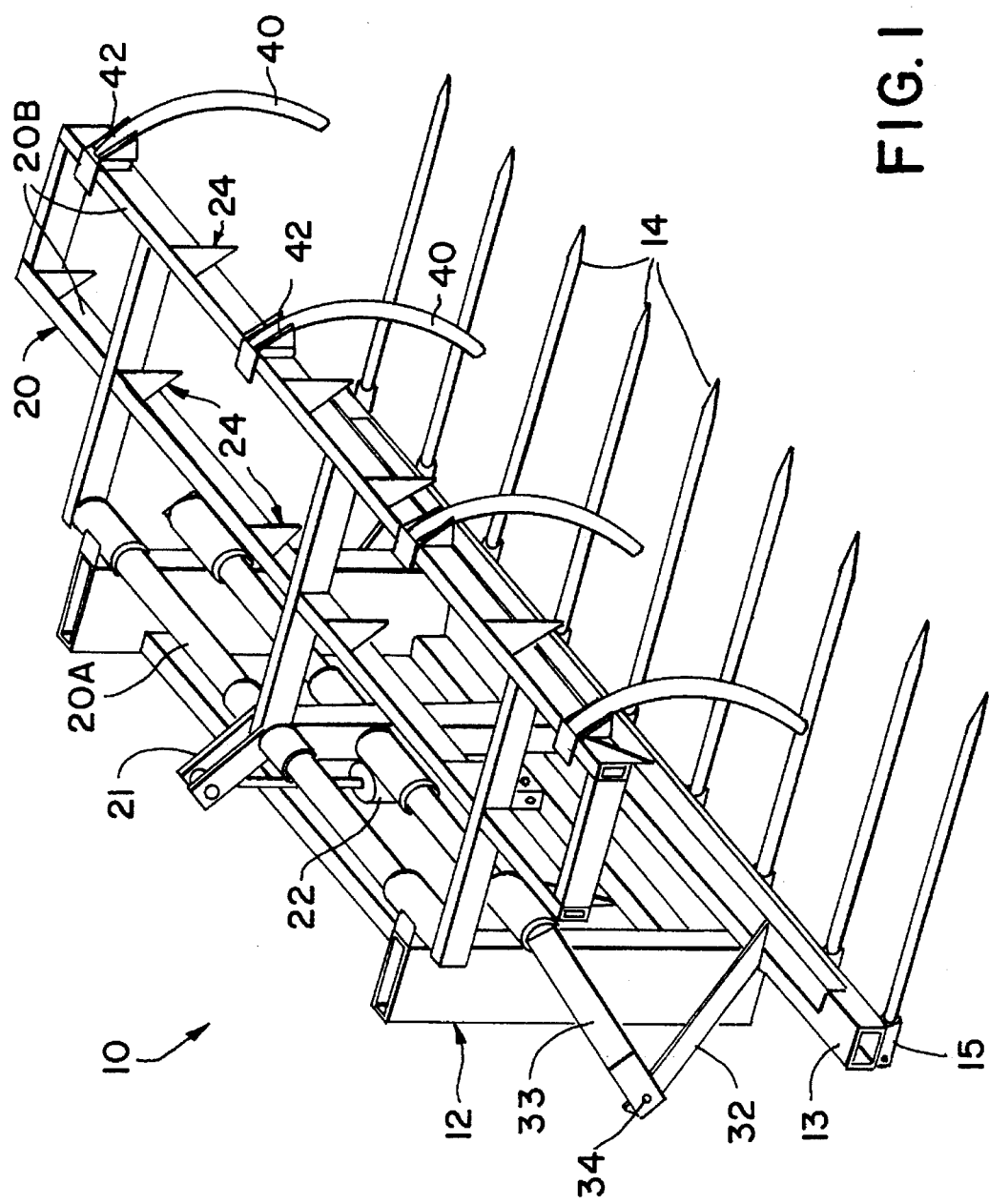
FIG. 1 is a perspective view of a preferred embodiment of bale handling apparatus of the invention.

In the drawings there is shown a preferred embodiment of bale handling apparatus 10 of the invention comprising an upright support frame member 12 having upper and lower portions. To cross member 13 on the lower portion of the frame 12 there are attached a plurality of tines or teeth members 14. The outer or forward end of each tine is preferably tapered, as illustrated.

To the upper portion of frame 12 there is pivotally attached a retainer member 20 which can be selectively raised or lowered by means of a hydraulic cylinder 22. The upper end of cylinder 22 is attached to arm 21 which is secured to beam 20A. When cylinder 22 is retracted, this causes beam 20A to rotate in order to cause retainer member 20 to pivot upwardly, as shown with dotted lines in FIG. 2. When cylinder 22 is extended, this causes beam 20A to rotate in the opposite direction in order to cause retainer member 20 to pivot downwardly.

The retainer member 20 preferably comprises a pair of parallel bars 20B (which are perpendicular to the longitudinal direction of tines or teeth 14). The spacing between bars 20B may vary, as desired.

To the lower surface of each of the bars 20B there preferably are attached a plurality of downwardly-extending grip members or blades 24. When the retainer member is pivoted downwardly against bales or other objects which are supported on tines or teeth 14, the grip members extend into the bales to assist in retaining the bales between the retainer member and teeth 14.

The preferred shape of each grip member 24 is shown in the drawings as a triangular planar member, with the plane of each grip member being perpendicular to the longitudinal direction of the teeth members 14. The height of each grip member may vary (e.g., from about 3 to 6 inches). A preferred height is about 4 inches. The number of grip members on each bar 20B is preferably six, but more or less could be used. It is also possible for the grip members on one bar to be staggered from the grip members on the other bar, although preferably the grip members in both rows are in alignment with each other. Of course, there may be more than two rows of grip members, if desired.

Preferably the outside edge 24A of each grip member is essentially vertical, while the inside edge 24B is angled slightly toward the longitudinal centerline of the apparatus. This arrangement results in the grip members urging the bales toward the centerline of the apparatus. Thus, this feature mends to prevent bales from shifting toward the outside edges of the apparatus when the bales are lifted and carried.

The push arm 30 extends cross-wise of the apparatus across the teeth members 14. It is not necessary for the push arm to have a length equal to the width of the entire apparatus, but preferably the push arm has a length extending to within a few inches of each side edge of the apparatus.

The push arm in its retracted position is parallel to, and in close proximity to, the cross-member 13 on the lower portion of the support frame. Arms 32 are secured at their lower ends to the cross-member 13, and their upper ends are pivotally connected by bolts 34 to the lower ends of link arms 33. The upper ends of link arms 33 are secured to beam 35. Arm 36 is secured at one end to beam 35 and is connected at its opposite end to hydraulic cylinder 37. When the cylinder 37 is extended, beam 35 is rotated so that the push arm moves to its retracted position, and when cylinder 37 is retracted, the push arm moves to its extended position (shown in dotted lines in FIG. 2) along teeth members 14. This action causes objects (e.g., bales) carried on the teeth members to move along the teeth and off the forward ends of the teeth.

If desired, grapple forks 40 may be attached to the forward edge of the retainer member 20, as illustrated. Typically each grapple fork can be attached to retainer member 20 by means of suitable brackets 42. There may be any desired number of grapple forks attached to the retainer member.

The tines or teeth members 14 are preferably detachably mounted to cross-member 13 (e.g., each tine may be slidably received in an appropriately shaped tubular receiver 15 and held in place by means of a bolt 17). After removing the bolt, a tine 14 may be detached and replaced with a new tine (e.g., to replace a damaged tine or to install longer or shorter tines, as desired).

The width of the apparatus may vary, as desired. For lifting and carrying 12 bales with the apparatus, the width of the apparatus is preferably nine feet, and the length of each tine 14 is about three feet. The spacing between adjacent tines 14 is about twelve inches.

Figure 2:
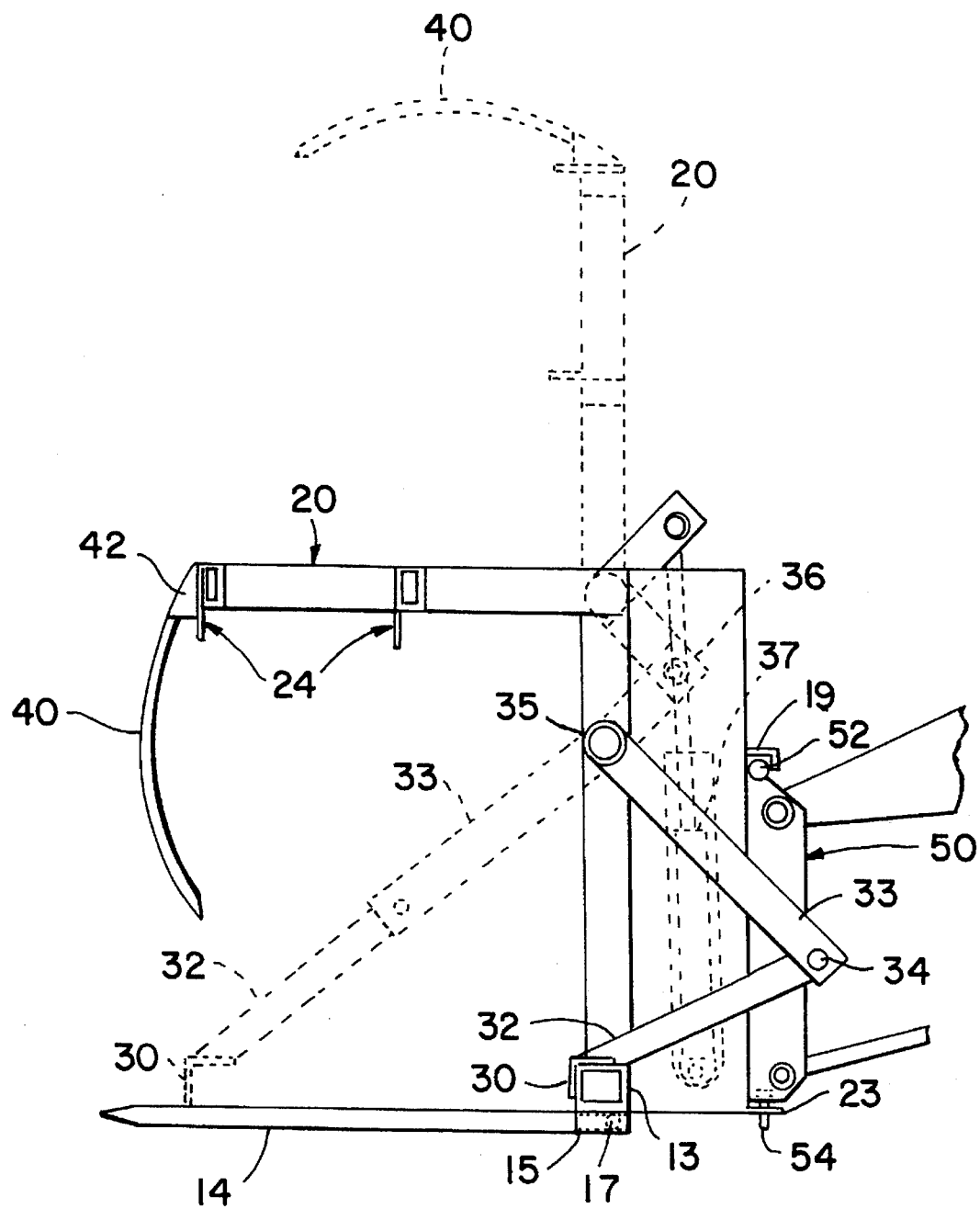
FIG. 2 is a side elevational view of the apparatus shown in FIG. 1.
Figure 3:
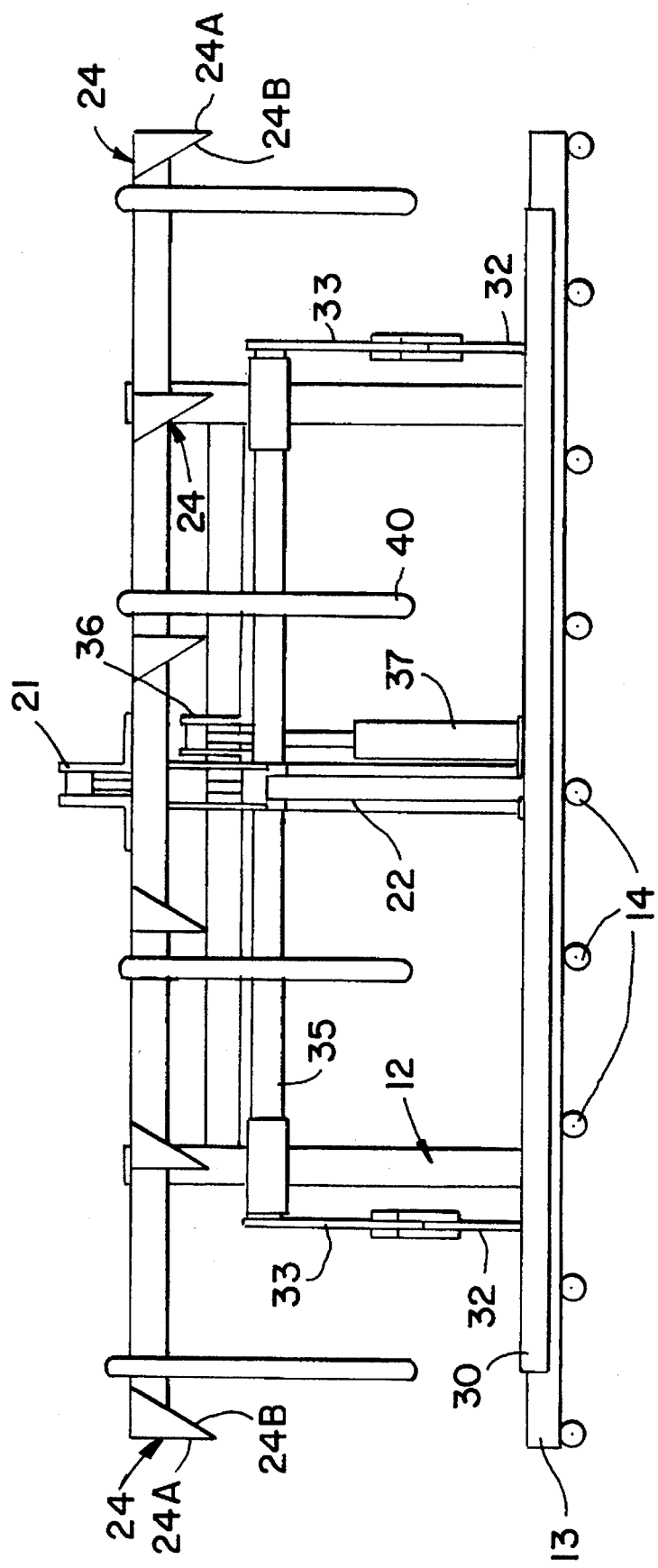
FIG. 3 is a front elevational view of the apparatus showing a preferred shape of grip members used thereon.

The support frame 12 may be connected to the forward end of a conventional tractor loader, either by means of appropriate pins or by means of appropriate attachment brackets. In FIG. 2 there is illustrated a quick connect attachment device 50 which is fastened to the forward end of a tractor loader and which readily connects to the apparatus of this invention. Beam 52 on the top of the device 50 fits beneath bracket 19, and pins 54 fit through corresponding openings in device 50 and bracket 23 on the rear of the apparatus 10.

Other variants are possible without departing from the scope of this invention. For example, the spacing between the retainer member and the teeth members may vary, as desired. Also, the width of the retainer member may vary. Typically, the retainer member has a width approximately equal to the distance between the two outside teeth members in the apparatus. The capacity of the apparatus for carrying bales or other objects will be dependent upon the width of the apparatus, the length of the teeth members, and the vertical distance between the teeth members and the retainer member. The type of attachment brackets may vary for connecting the apparatus of the invention to the forward end of a tractor loader.

What is claimed is:

1. Bale handling apparatus for use in combination with a tractor loader having lift arms which can be raised and lowered, wherein said apparatus comprises:

(a) a support frame member having upper and lower portions;

(b) a plurality of elongated teeth members attached to said lower portion of said frame member at fixed positions and projecting forwardly from said frame member; wherein said teeth members are of the same size and shape; wherein said teeth members are parallel to each other and are spaced apart about 12 inches;

(c) a retainer member pivotally attached to said upper portion of said frame member above said teeth members; wherein said retainer member is pivotable between upper and lower positions; wherein said retainer member includes a plurality of downwardly-extending triangular grip members; and (d) a push arm between said teeth members and said retainer member; wherein said push arm is movable between retracted and extended positions to move objects on said teeth members away from said support frame member.

2. Bale handling apparatus in accordance with claim 1, wherein said retainer member comprises parallel bar members whose longitudinal aspect is perpendicular to the longitudinal aspect of said teeth members.

3. Bale handling apparatus in accordance with claim 2, wherein said retainer member includes a plurality of downwardly-extending grip members carried by said parallel bar members.

4. Bale handling apparatus in accordance with claim 3, wherein said grip members comprise triangular blades.

5. Bale handling apparatus in accordance with claim 1, wherein said push arm includes a longitudinal aspect which is perpendicular to the longitudinal aspect of said teeth members and rests on said teeth members.

6. Bale handling apparatus in accordance with claim 1, wherein said teeth members are detachably secured to said frame member.

7. Bale handling apparatus in accordance with claim 1, further comprising grapple forks secured to said retainer member.

8. Bale handling apparatus in accordance with claim 1, wherein said retainer member includes a rear portion which is pivotably attached to said upper portion of said frame member.

9. Bale handling apparatus for use in combination with a tractor loader having lift arms which can be raised and lowered, wherein said apparatus comprises:

(a) an upright support frame member having upper and lower portions;

(b) a plurality of elongated teeth members attached to said lower portion of said frame member at fixed positions and projecting forwardly from said frame member; wherein said teeth members are of the same size and shape; wherein said teeth members are parallel to each other and are spaced apart about 12 inches;

(c) a retainer member pivotally attached to said upper portion of said frame member above said teeth members; wherein said retainer member is pivotable between upper and lower positions; wherein said retainer member includes a plurality of downwardly-extending triangular grip members;

(d) a push arm between said teeth members and said retainer member; wherein said push arm is movable between retracted and extended positions to move objects on said teeth members away from said support frame member; and (e) first and second hydraulic cylinder means for selectively raising and lowering said retainer member and moving said push arm between said retracted and extended positions.

10. Bale handling apparatus in accordance with claim 9, wherein said retainer member comprises parallel bar members whose longitudinal aspect is perpendicular to the longitudinal aspect of said teeth members.

11. Bale handling apparatus in accordance with claim 10, wherein said retainer member includes a plurality of downwardly-extending grip members carried by said parallel bar members.

12. Bale handling apparatus in accordance with claim 11, wherein said grip members comprise triangular blades.

13. Bale handling apparatus in accordance with claim 9, wherein said push arm includes a longitudinal aspect which is perpendicular to the longitudinal aspect of said teeth members and rests on said teeth members.

14. Bale handling apparatus in accordance with claim 9, wherein said teeth members are detachably secured to said frame member.

15. Bale handling apparatus in accordance with claim 9, further comprising grapple forks secured to said retainer member.

16. Bale handling apparatus in accordance with claim 9, wherein said retainer member includes a rear portion which is pivotably attached to said upper portion of said frame member.

17. Bale handling apparatus in accordance with claim 4, wherein each said triangular blade is a planar member which is perpendicular to the longitudinal aspect of the teeth members.

18. Bale handling apparatus in accordance with claim 17, wherein each said triangular blade includes an outside edge which is essentially vertical.

* * * * *